United States Patent
Cui et al.

(10) Patent No.: US 12,328,609 B2
(45) Date of Patent: Jun. 10, 2025

(54) BEAM INFORMATION REPORTING FOR PUCCH SECONDARY CELL ACTIVATION

(71) Applicant: Apple Inc., Cupertino, CA (US)

(72) Inventors: Jie Cui, San Jose, CA (US); Qiming Li, Beijing (CN); Dawei Zhang, Saratoga, CA (US); Haitong Sun, Cupertino, CA (US); Hong He, San Jose, CA (US); Huaning Niu, San Jose, CA (US); Manasa Raghavan, Sunnyvale, CA (US); Xiang Chen, Campbell, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/755,682

(22) PCT Filed: May 11, 2021

(86) PCT No.: PCT/CN2021/093113
§ 371 (c)(1),
(2) Date: May 5, 2022

(87) PCT Pub. No.: WO2022/236700
PCT Pub. Date: Nov. 17, 2022

(65) Prior Publication Data
US 2024/0163699 A1 May 16, 2024

(51) Int. Cl.
*H04B 7/0491* (2017.01)
*H04B 7/06* (2006.01)
(Continued)

(52) U.S. Cl.
CPC .......... *H04W 24/08* (2013.01); *H04B 7/0695* (2013.01); *H04L 5/0048* (2013.01); *H04W 72/21* (2023.01)

(58) Field of Classification Search
CPC ..... H04W 16/28; H04B 7/043; H04B 7/0016; H04B 7/0617; H04B 7/0695; H04B 17/309; H04B 17/043; H04B 17/0016
See application file for complete search history.

(56) References Cited

U.S. PATENT DOCUMENTS 11,240,809 B2 *  2/2022  Tsai ................. H04W 56/0015
2020/0100154 A1  3/2020  Cirik et al.
(Continued)

FOREIGN PATENT DOCUMENTS

CN     111918324      11/2020
WO   2020/057518       3/2020

OTHER PUBLICATIONS

Qualcomm Incorporated, "Enhancements on Multi-beam Operation"; 3GPP TSG-RAN WG1 Meeting #98; R1-1911127; Oct. 20, 2019; 22 sheets.
(Continued)

*Primary Examiner* — Bo Hui A Zhu
(74) *Attorney, Agent, or Firm* — Fay Kaplun & Marcin, LLP (57) ABSTRACT

A user equipment (UE) is configured to report beam information for a secondary cell. The UE receives a signal from a network indicating that a physical uplink control channel (PUCCH) secondary cell (SCell) activation procedure has been initiated, collects beam information corresponding to a target PUCCH SCell, reports the beam information to the network, determines that the target PUCCH SCell has been activated as a PUCCH SCell and transmits uplink control information (UCI) over a PUCCH to the PUCCH SCell, wherein the UE is also configured with a different PUCCH corresponding to a primary cell (PCell).

18 Claims, 9 Drawing Sheets

(51) Int. Cl.
*H04L 5/00* (2006.01)
*H04W 24/08* (2009.01)
*H04W 72/21* (2023.01)

(56) References Cited

U.S. PATENT DOCUMENTS

2021/0111851 A1    4/2021  Lin
2023/0362817 A1*  11/2023  Da Silva ............... H04W 24/10
2024/0171997 A1*   5/2024  Du ....................... H04B 7/0695

OTHER PUBLICATIONS

Nokia et al., "Discussion on the activation delay for deactivation PUCCH SCell"; 3GPP TSG-RA WG4 Meeting #98-bis-e, R4-2106408, Apr. 2, 2021, 5 sheets.
3GPP, "8 UE Measurements Procedures"; Mobile Competence Centre; 650, Route Des Lucioles, F-06821 Sophia-Antipolis Cedex, France, vol. RAN WG5, Apr. 2, 2019, Section 8.-8.1.6.4.2, 29 sheets.
Apple "On PUCCH SCell activation and deactivation"; 3GPP TSG-RAN4 Meeting #98bis-e, R4-2104833, Apr. 2, 2021, 10 sheets.

\* cited by examiner

BEAM INFORMATION REPORTING FOR PUCCH SECONDARY CELL ACTIVATION

BACKGROUND

A user equipment (UE) may be configured with a physical uplink control channel (PUCCH) secondary cell (SCell). Once activated, the UE may send uplink control information (UCI) to the SCell over the PUCCH. To enable PUCCH SCell activation, the UE may report beam information to the network. However, for any of a variety of different reasons, the UE may be unable to report the beam information to the network.

SUMMARY

Some exemplary embodiments are related to a processor of a user equipment (UE) configured to perform operations. The operations include receiving a signal from a network indicating that a physical uplink control channel (PUCCH) secondary cell (SCell) activation procedure has been initiated, collecting beam information corresponding to a target PUCCH SCell, reporting the beam information to the network, determining that the target PUCCH SCell has been activated as a PUCCH SCell and transmitting uplink control information (UCI) over a PUCCH to the PUCCH SCell, wherein the UE is also configured with a different PUCCH corresponding to a primary cell (PCell).

Other exemplary embodiments are related to a processor of a user equipment (UE) configured to perform operations. The operations include receiving a signal from a network indicating that a physical uplink control channel (PUCCH) secondary cell (SCell) activation procedure has been initiated, receiving one or more synchronization signal blocks (SSBs) from a cell, transmitting a random access channel (RACH) preamble to the cell, wherein the RACH preamble is selected based on the one or more SSBs, determining that the cell has been configured as a PUCCH SCell for the UE and transmitting uplink control information (UCI) over a PUCCH to the cell, wherein the UE is also configured with a different PUCCH corresponding to a primary cell (PCell).

Still further exemplary embodiments are related to a processor of a base station configured to perform operations. The operations include transmitting a signal to a user equipment (UE) indicating that a physical uplink control channel (PUCCH) secondary cell (SCell) activation procedure has been initiated and receiving beam information corresponding to a target PUCCH SCell from the UE.

Additional exemplary embodiments are related to a processor of a base station configured to perform operations. The operations include transmitting a reference signal or a synchronization signal block (SSB) that is received by a user equipment (UE) during a physical uplink control channel (PUCCH) secondary cell (SCell) activation procedure, determining that the base station has been activated as a PUCCH SCell for the UE and receiving uplink control information (UCI) from the UE over a PUCCH.

DETAILED DESCRIPTION

The exemplary embodiments may be further understood with reference to the following description and the related appended drawings, wherein like elements are provided with the same reference numerals. The exemplary embodiments relate to physical uplink control channel (PUCCH) secondary cell (SCell) activation.

The exemplary embodiments are described with regard to a UE. However, reference to the term UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The PUCCH is an uplink channel that may carry uplink control information (UCI). The term UCI may encompass various types of control information. For example, the contents of UCI may include, but is not limited to, hybrid automatic repeat request (HARQ) feedback (e.g., acknowledgement (ACK), negative acknowledgement (NACK), etc.), scheduling requests (SRs), channel state information (CSI) or a combination thereof. The term "PUCCH SCell" may refer to a SCell that is configured with a PUCCH. Thus, the UE may be configured with multiple PUCCHs, each PUCCH corresponding to a different group of one or more cells. For example, the UE may transmit UCI on a first PUCCH to a primary cell (PCell) and transmit UCI on a second different PUCCH to the PUCCH SCell.

Those skilled in the art will understand that the term "PUCCH SCell activation" generally refers to a procedure for configuring the PUCCH between the UE and the SCell. PUCCH SCell activation may be initiated by the network via a downlink signal. The procedure may also include the UE acquiring timing information corresponding to the SCell and reporting beam information corresponding to the SCell. Once activated, the UE may send UCI to the SCell over the PUCCH.

The exemplary embodiments introduce techniques that may be implemented on the UE side and the network side for PUCCH SCell activation. Throughout this description, the term "PUCCH SCell" may refer to either a SCell that is configured with PUCCH or a cell the UE and network are attempting to activate. Thus, the term "PUCCH SCell" may represent a cell that is in the process of being activated or has been activated via PUCCH SCell activation.

In addition, the term "target PUCCH SCell" may refer to a cell that is considered for PUCCH SCell activation or a cell the UE and network are attempting to activate. Thus, the term "target PUCCH SCell" may represent a cell before PUCCH SCell activation has been initiated or a cell that is in the process of being activated via PUCCH SCell activation. Accordingly, in some examples, the terms "PUCCH SCell" and "target PUCCH SCell" may be used interchangeably when describing a cell that that is in the process of being activated via PUCCH SCell activation.

To facilitate PUCCH SCell activation, the UE may report beam information for a target PUCCH SCell to the network. For example, the beam information may comprise a downlink beam synchronization signal block (SSB) index, CSI, layer 1 (L1)-reference signal received power (RSRP) and/or any other appropriate type of information that may be utilized for PUCCH SCell activation. The beam information may be reported to the network and the network may determine the associated SSB in physical downlink control channel (PDCCH) order for random access based on the beam information. Once activated, the UE may send UCI to the SCell over the PUCCH.

A variety of different issues have been identified with regard to implementing PUCCH SCell activation. One issue relates to how the UE is to report beam information when the target PUCCH SCell is an unknown cell. For instance, prior to PUCCH SCell activation, the UE may not have collected any measurement data corresponding to the target PUCCH SCell because the network has not configured the UE to perform any measurements on the target PUCCH SCell. In this type of scenario, the target PUCCH SCell may be considered an unknown cell. As indicated above, the network use the beam information to perform various operations during PUCCH SCell activation. Accordingly, there exists a need for techniques that enable the UE to report beam information corresponding to a target PUCCH SCell when the target PUCCH SCell is an unknown cell. While the exemplary embodiments may be utilized for the unknown cell scenario referenced above, the exemplary embodiments are not limited to this type of deployment scenario.

The exemplary embodiments introduce techniques that enable the implementation of PUCCH SCell activation in a variety of different deployment scenarios. In one aspect, the exemplary embodiments relate to utilizing layer 3 (L3) measurement reporting on the PCell to provide the network with beam information for PUCCH SCell activation. In another aspect, the exemplary embodiments relate to utilizing physical uplink shared channel (PUSCH) based CSI/L1-RSRP reporting on the PCell to provide the network with the beam information for PUCCH SCell activation. In a further aspect, the exemplary embodiments relate to utilizing conditioned contention based random access (CBRA) during PUCCH SCell activation. In another aspect, the exemplary embodiments introduce cross PUCCH group CSI reporting for the target PUCCH SCell. In a further aspect, the exemplary embodiments introduce preconditioned based PUCCH SCell activation. Each of these exemplary aspects will be described in more detail below. The exemplary techniques described herein may be used in conjunction with currently implemented PUCCH SCell activation procedures, future implementations of PUCCH SCell activation procedures or independently from other PUCCH SCell activation techniques.

Figure 1:
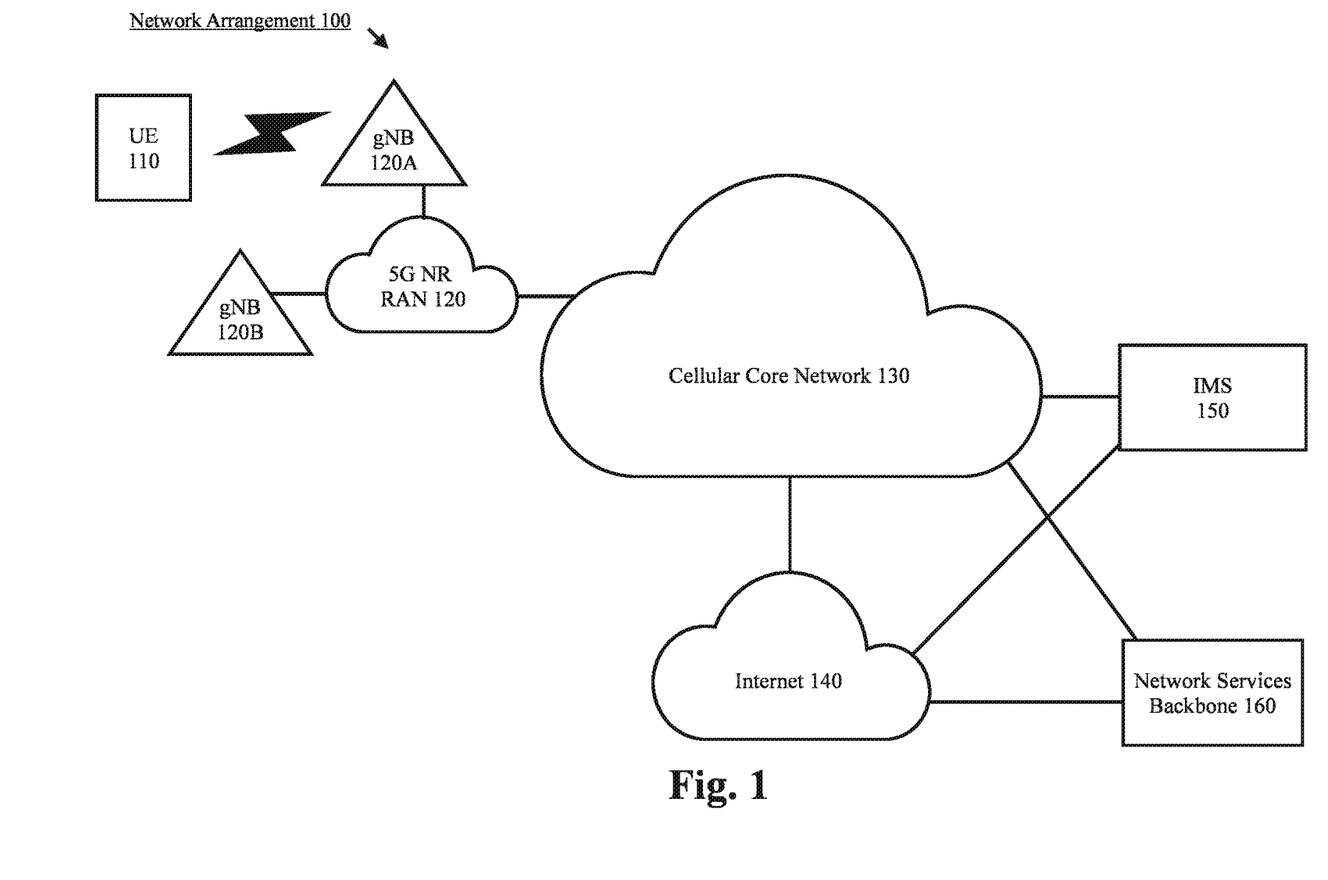
FIG. 1 shows an exemplary network arrangement according to various exemplary embodiments.

FIG. 1 shows an exemplary network arrangement 100 according to various exemplary embodiments. The exemplary network arrangement 100 includes the UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network arrangement 100, the network with which the UE 110 may wirelessly communicate is a fifth generation (5G) new radio (NR) radio access network (RAN) 120. However, the UE 110 may also communicate with other types of networks (e.g., 5G cloud RAN, a next generation RAN (NG-RAN), long term evolution (LTE) network, a legacy cellular network, a wireless local area network (WLAN), etc.) and the UE 110 may also communicate with networks over a wired connection. Therefore, in this example, the UE 110 may have a 5G NR chipset to communicate with the 5G NR RAN 120.

The 5G NR-RAN 120 may be a portion of cellular networks that may be deployed by cellular providers (e.g., Verizon, AT&T, T-Mobile, etc.). The network 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

In network arrangement 100, the 5G NR RAN 120 is shown with a gNB 120A and a gNB 120B. However, an actual network arrangement may include any number of different types of base stations or cells deployed by any number of RANs. Thus, the example of a single 5G NR RAN 120 and two gNBs 120A, 120B, is merely provided for illustrative purposes.

As mentioned above, the exemplary embodiments relate to a PUCCH SCell. Those skilled in the art will understand that the SCell may be utilized in a carrier aggregation (CA) scenario. To provide an example within the context of the network arrangement 100, the gNB 120A may be configured as a PCell. Thus, the UE 110 may be configured with a first PUCCH to transmit UCI to the PCell. Once activated, the gNB 120B may be configured as a PUCCH SCell. Thus, the UE 110 may be configured with a second different PUCCH to transmit UCI to the PUCCH SCell. In some embodiments, each PUCCH may be associated with a group of cells, which may be referred to as a PUCCH group. Thus, UCI transmitted over the first PUCCH may corresponding to the PCell (e.g., gNB 120A) and zero or more SCells. UCI transmitted over the second PUCCH may corresponding to the PUCCH SCell (e.g., gNB 120B) and zero or more SCells.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific cell or base station (e.g., gNB 120A, gNB 120B).

The network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. It may include the evolved packet core (EPC) and/or the fifth-generation core (5GC). The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
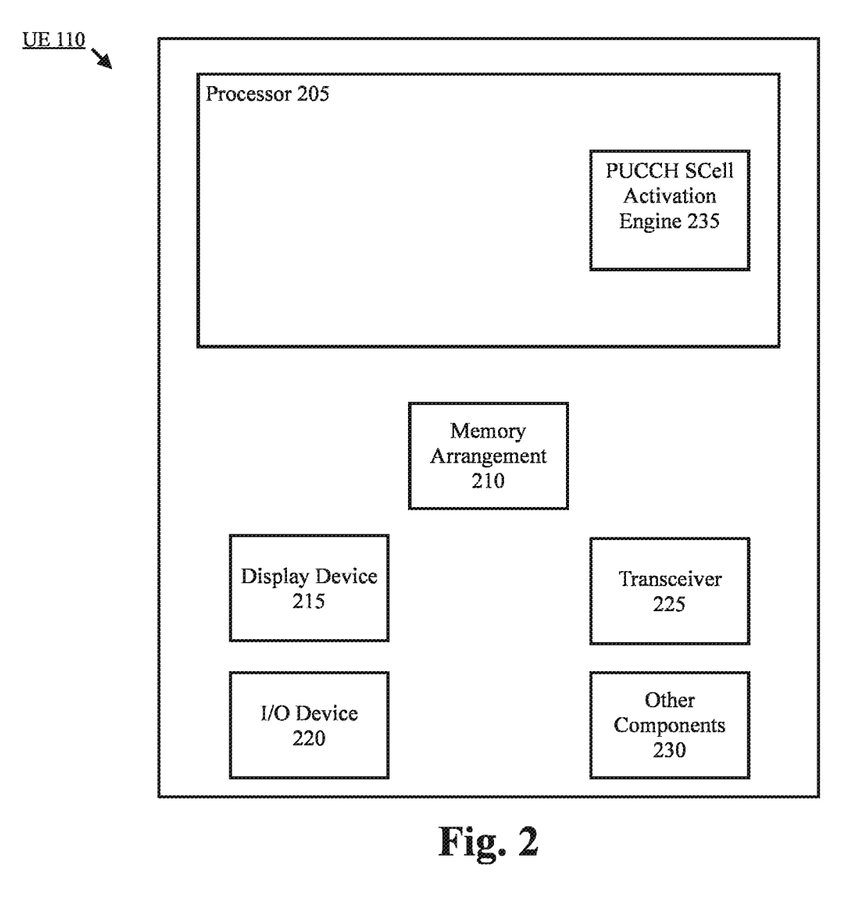
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include a PUCCH SCell activation engine 235. The PUCCH SCell activation engine 235 may perform various operations related to PUCCH SCell activation such as, but not limited to, transmitting PUCCH SCell activation capability information, collecting beam information corresponding to a target PUCCH SCell and reporting beam information corresponding to the target PUCCH SCell to the network.

The above referenced engine 235 being an application (e.g., a program) executed by the processor 205 is merely provided for illustrative purposes. The functionality associated with the engine 235 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120 and/or any other appropriate type of network. Accordingly, the transceiver 225 may operate on a variety of different frequencies or channels (e.g., set of consecutive frequencies).

Figure 3:
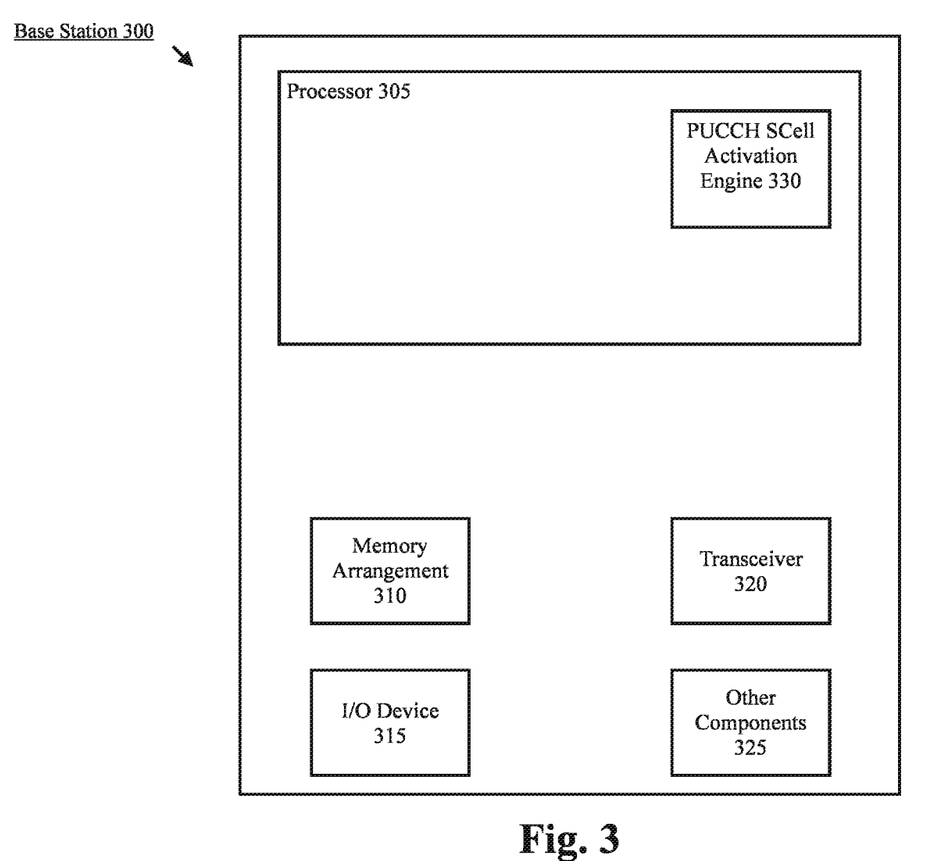
FIG. 3 shows an exemplary base station according to various exemplary embodiments.

FIG. 3 shows an exemplary base station 300 according to various exemplary embodiments. The base station 300 may represent any access node (e.g., gNB 120A, gNB 120B, etc.) through which the UE 110 may establish a connection and manage network operations.

The base station 300 may include a processor 305, a memory arrangement 310, an input/output (I/O) device 315, a transceiver 320, and other components 325. The other components 325 may include, for example, a battery, a data acquisition device, ports to electrically connect the base station 300 to other electronic devices, etc.

The processor 305 may be configured to execute a plurality of engines of the base station 300. For example, the engines may include PUCCH SCell activation engine 330. When the base station 300 is to operate as a PCell, the PUCCH SCell activation engine 330 may perform various operations related to PUCCH SCell activation such as, but not limited to, receiving PUCCH SCell activation capability information, initiating PUCCH SCell activation and receiving beam information corresponding to the target PUCCH SCell from the UE 110. When the base station 300 is to operate as a SCell, the PUCCH SCell activation engine 330 may perform various operations related to PUCCH SCell activation such as, but not limited to, transmitting downlink beams that may provide the basis for the UE 110 to collect beam information, initiating PUCCH SCell activation and receiving beam information corresponding from the UE 110.

The above noted engine 330 being an application (e.g., a program) executed by the processor 305 is only exemplary. The functionality associated with the engine 330 may also be represented as a separate incorporated component of the base station 300 or may be a modular component coupled to the base station 300, e.g., an integrated circuit with or without firmware. For example, the integrated circuit may include input circuitry to receive signals and processing circuitry to process the signals and other information. In addition, in some base stations, the functionality described for the processor 305 is split among a plurality of processors (e.g., a baseband processor, an applications processor, etc.). The exemplary embodiments may be implemented in any of these or other configurations of a base station.

The memory 310 may be a hardware component configured to store data related to operations performed by the base station 300. The I/O device 315 may be a hardware component or ports that enable a user to interact with the base station 300. The transceiver 320 may be a hardware component configured to exchange data with the UE 110 and any other UE in the system 100. The transceiver 320 may operate on a variety of different frequencies or channels (e.g., set of consecutive frequencies). Therefore, the transceiver 320 may include one or more components (e.g., radios) to enable the data exchange with the various networks and UEs.

Figure 4:
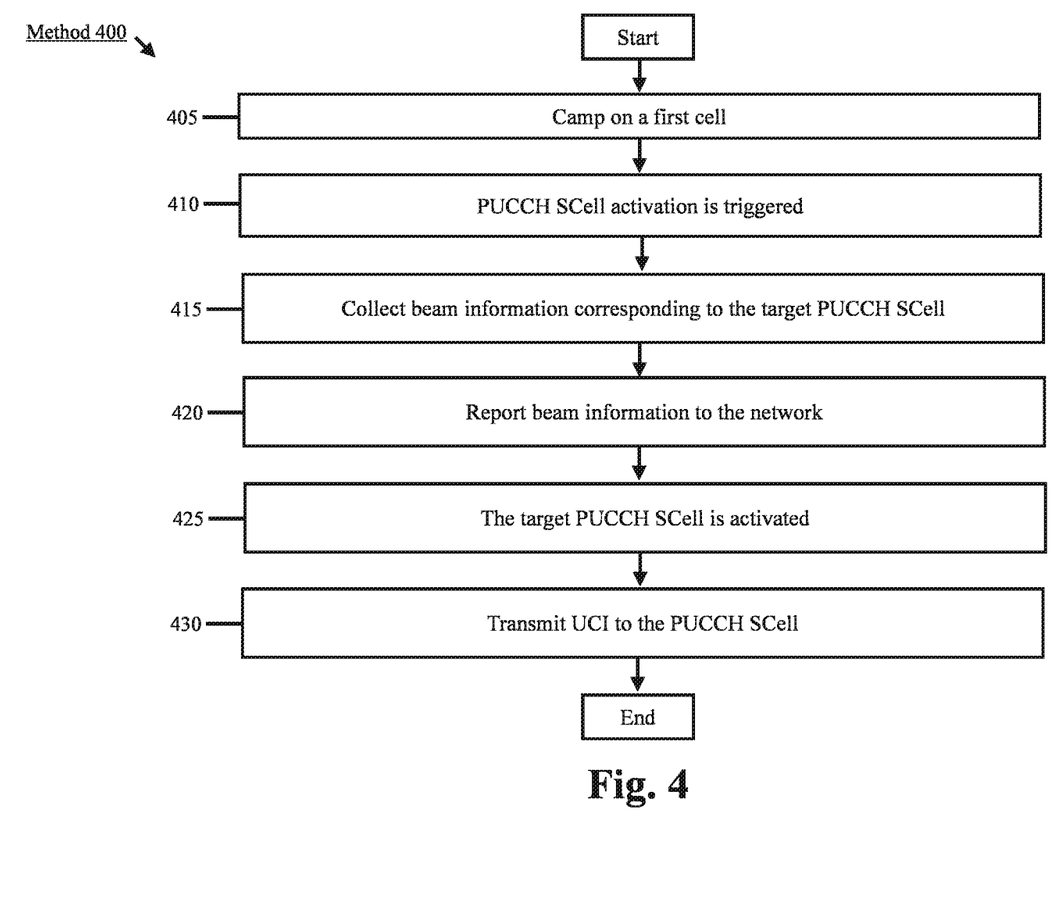
FIG. 4 shows a method for physical uplink control channel (PUCCH) secondary cell (SCell) activation according to various exemplary embodiments.

FIG. 4 shows a method 400 for PUCCH SCell activation according to various exemplary embodiments. The method 400 will be described from the perspective of the UE 110 and is provided as a general overview of some of the operations that may be performed for PUCCH SCell activation. Additional details for the exemplary beam information reporting techniques will be provided below with regard to the signaling diagrams 500-900.

In 405, the UE 110 camps on a first cell of the network (e.g., gNB 120A). In 410, PUCCH SCell activation is triggered. The UE 110 may determine that PUCCH SCell activation has been initiated based on a signal received from the network or on any other appropriate basis. For example, the network may transmit a signal to the UE 110 that initiates PUCCH SCell activation. The signal may be a radio resource control (RRC) signal, a medium access control (MAC) control element (CE) command, downlink control information (DCI) or any other appropriate type of signal. Alternatively, in some embodiments, the UE 110 may transmit a signal to the network that triggers PUCCH SCell activation. The signal may be a measurement report, part of a random access procedure, capability information, an explicit request or any other appropriate type of signal. Throughout this description, any reference to a particular signal being used to initiate the PUCCH SCell activation is merely provided for illustrative purposes. The exemplary embodiments may apply to PUCCH SCell activation being triggered by any appropriate type of signal.

In 415, the UE 110 may collect beam information corresponding to a target PUCCH SCell (e.g., gNB 120B). The beam information may comprise a downlink beam SSB index, CSI, L1-RSRP, layer 3 (L3) measurement data, and/or any other appropriate type of information that may be utilized for PUCCH SCell activation. To provide an example, the UE 110 may monitor for signals broadcast by the target PUCCH SCell. The signals may be transmitted via one or more downlink beams and comprise SSB and/or downlink reference signals. These signals may provide the basis for the UE 110 to derive the beam information corresponding to the PUCCH SCell.

In 420, the UE 110 may report the beam information to the network. As will be described in more detail below, some of the exemplary techniques described herein relate to how the UE 110 reports the beam information corresponding to the target PUCCH SCell to the network. In some embodiments, the beam information may be transmitted to the PCell (e.g., gNB 120A) on the PUCCH configured between the UE 110 and the PCell. In other embodiments, the beam information may be transmitted to the PCell (e.g., gNB 120A) on the PUSCH. In further embodiments, the beam information may be transmitted to the target PUCCH SCell during a random access procedure. As mentioned above, the method 400 is provided as a general overview of some of the operations that may be performed for PUCCH SCell activation. Additional details for the exemplary beam information reporting techniques will be provided below with regard to the signaling diagrams 500-900.

In 425, the target PUCCH SCell is activated. Thus, the UE 110 and the target PUCCH SCell are synchronized and configured with a PUCCH. At this time, the UE 110 may be configured with multiple PUCCH groups. For example, one PUCCH group may comprise the PCell (e.g., gNB 120A) and zero or more SCells and another PUCCH group may comprise the PUCCH SCell (e.g., gNB 120B) and zero or more additional SCells. In 430, the UE 110 transmits UCI to the PUCCH SCell (e.g., gNB 120A) on the PUCCH.

Figure 5:
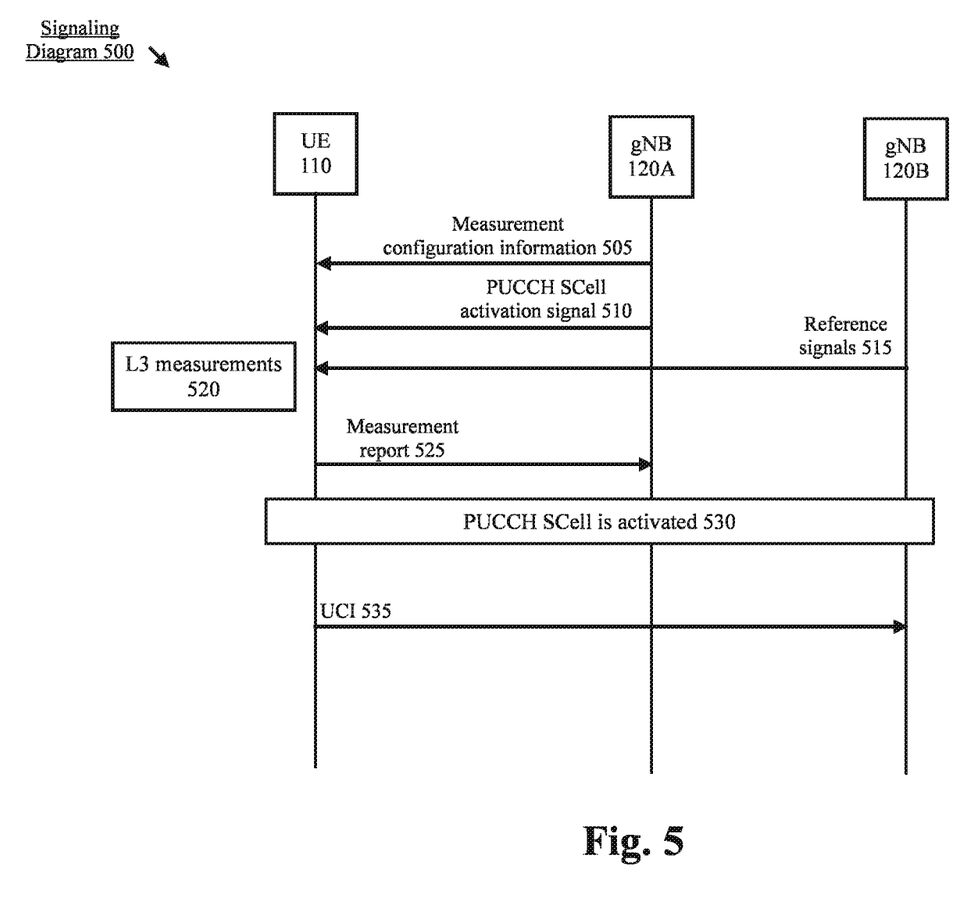
FIG. 5 shows a signaling diagram for utilizing layer 3 (L3) measurement reporting to report beam information for PUCCH SCell activation according to various exemplary embodiments.

FIG. 5 shows a signaling diagram 500 for utilizing L3 measurement reporting to report beam information for PUCCH SCell activation according to various exemplary embodiments. The signaling diagram 500 includes the UE 110, the gNB 120A and the gNB 120B. In this example, the gNB 120A may perform operations associated with a PCell and the gNB 120B may perform operations associated with a SCell.

In 505, the UE 110 receives configuration information for collecting and reporting L3 measurement data corresponding to cells other than a serving cell. This configuration information may include an indication of the type of measurements to be performed, the type of reference signals to be measured, the type of metrics to be generated, threshold values or conditions that are to trigger the transmission of a measurement report, neighbor cell IDs or any other type of information that may enable the UE 110 to collect L3 measurement data corresponding to the target PUCCH SCell.

In 510, the UE 110 receives a PUCCH SCell activation signal. The PUCCH SCell activation signal may indicate to the UE 110 that PUCCH SCell activation has been triggered by the network. For example, the PUCCH SCell activation signal may be an RRC message or a MAC CE that triggers the L3 measurement report. However, reference to the PUCCH SCell activation signal is merely provided for illustrative purposes. The UE 110 may determine that PUCCH SCell activation has been initiated based on any appropriate type of signal received from the network or on any other appropriate basis.

In 515, the target SCell may broadcast SSB, CSI-reference signal (RS) or any other appropriate type of reference signal. These resources may be aperiodic, semi-persistent or periodic. In 520, the UE 110 performs L3 measurements on the signal transmitted in 515 to acquire the beam information.

In 525, the UE 110 transmits a measurement report to the PCell (e.g., gNB 120A). The measurement report may comprise the beam information corresponding to the target PUCCH SCell (e.g., gNB 120B) and be carried by an RRC message, a MAC message, via the PUSCH or any other appropriate type of signaling technique. In some embodiments, instead of the PCell, the UE 110 may transmit the measurement report to a different serving cell configured to receive the measurement report.

In some scenarios, the timing advance (TA) of the PCell (e.g., gNB 120A) may be different than the TA of the target PUCCH SCell. Thus, from the perspective of the UE 110, the TA of the target PUCCH SCell may be invalid. The following description provides an example of techniques that may be implemented by the network to address the timing and beam information issues that are associated with an invalid TA.

During PUCCH SCell activation, after receiving the measurement report and its beam information, the network may determine the associated SSB in the PDCCH order to trigger random access channel (RACH) on the target PUCCH SCell if the TA of the target PUCCH SCell is invalid. The associated SSB may be selected by the network based on the L3 measurement report. For example, the SSB associated with the most favorable metric may be selected. Since the SSB is quasi-co-located (QCL) with a CSI-RS, a metric corresponding to either SSB or CSI-RS may be used to select the associated SSB in the PDCCH order. However, this example is merely provided for illustrative purposes, this selection may be performed by the network on any appropriate basis.

In addition, the network may determine the active transmission configuration indication (TCI) for the PDCCH, physical downlink shared channel (PDSCH) and/or CSI-RS of the target PUCCH SCell. The TCI may be selected by the network based on the L3 measurement report. For example, the active TCI may be QCLed with an SSB and/or CSI-RS. The SSB and/or CSI-RS associated with the most favorable metric may provide the basis for the network to determine the active TCI. However, this example is merely provided for illustrative purposes, this selection may be performed by the network on any appropriate basis.

Further, the network may determine an active uplink spatial relation for the PUCCH of the target PUCCH SCell. The uplink spatial relation may be determined by the network based on the L3 measurement report. For example, the SSB and/or CSI-RS associated with the most favorable metric may provide the basis for the network to determine the uplink spatial relation. However, this example is merely provided for illustrative purposes, this selection may be performed by the network on any appropriate basis.

In 530, the target PUCCH SCell is activated. Accordingly, in 535, the UE 110 may transmit UCI to the PUCCH SCell.

Figure 6:
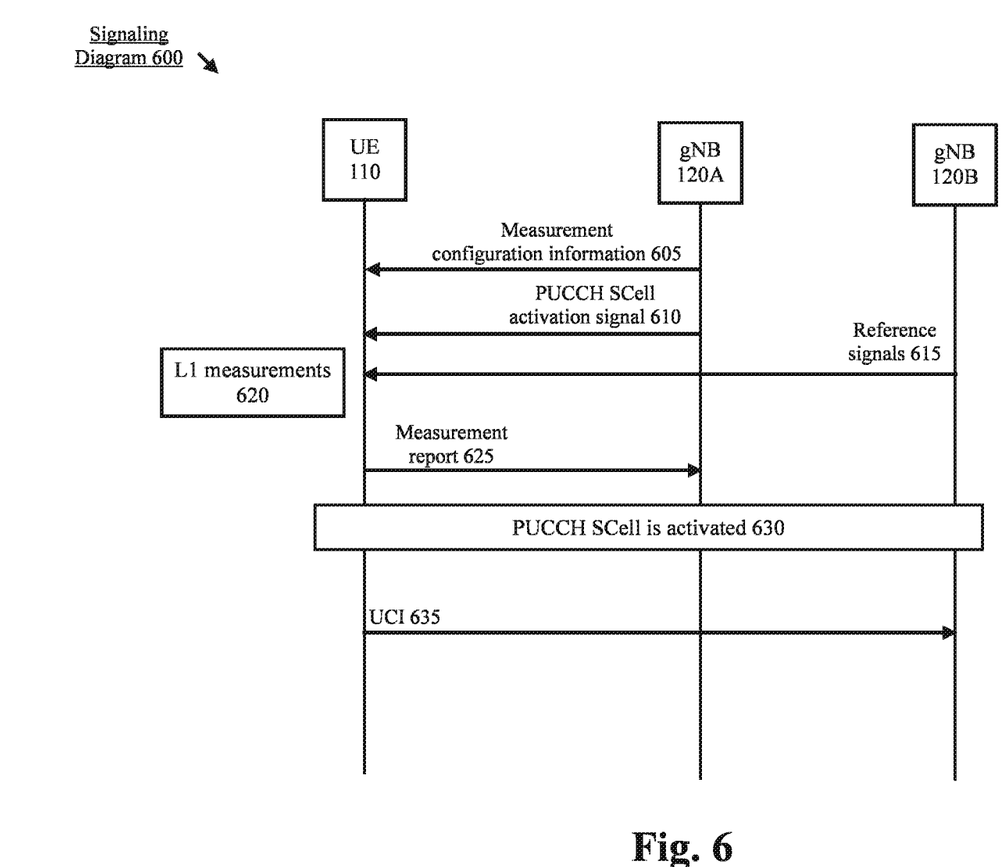
FIG. 6 shows a signaling diagram for utilizing physical uplink shared channel (PUSCH) based reporting to report beam information for PUCCH SCell activation according to various exemplary embodiments.

FIG. 6 shows a signaling diagram 600 for utilizing PUSCH based reporting to report beam information for PUCCH SCell activation according to various exemplary embodiments. The signaling diagram 600 includes the UE 110, the gNB 120A and the gNB 120B. In this example, the gNB 120A may perform operations associated with a PCell and the gNB 120B may perform operations associated with a SCell.

In 605, the UE 110 receives configuration information for collecting and reporting L1 measurement data corresponding to cells other than a serving cell. This configuration information may include an indication of the type of measurements to be performed, the type of reference signals to be measured, the type of metrics to be generated, threshold values or conditions that are to trigger the transmission of a measurement report, neighbor cell IDs or any other type of information that may enable the UE 110 to collect L1 measurement data corresponding to the target PUCCH SCell.

In 610, the UE 110 receives a PUCCH SCell activation signal. The PUCCH SCell activation signal may indicate to the UE 110 that PUCCH SCell activation has been triggered by the network. For example, the PUCCH SCell activation signal may be an RRC message or a MAC CE that triggers the L1 measurement report. However, reference to the PUCCH SCell activation signal is merely provided for illustrative purposes. The UE 110 may determine that PUCCH SCell activation has been initiated based on any appropriate type of signal received from the network or on any other appropriate basis.

In 615, the target SCell (e.g., gNB 120B) may broadcast SSB, CSI-RS or any other appropriate type of reference signal. These resources may be aperiodic, semi-persistent or periodic. In 620, the UE 110 performs L1 measurements on the signal transmitted in 615 to acquire the beam information.

In 625, the UE 110 transmits a measurement report to the PCell (e.g., gNB 120A). The measurement report may comprise the beam information corresponding to the target PUCCH SCell (e.g., gNB 120B) and be transmitted over the PUSCH. Like the measurement resources, the measurement report may be aperiodic, semi-persistent or periodic. Thus, there may be a scenario where this beam information is provided to the network outside of the PUCCH SCell activation procedure. In some embodiments, instead of the PCell, the UE 110 may transmit the measurement report to a different serving cell configured to receive the measurement report.

As mentioned above, in some scenarios, the TA of the target PUCCH SCell may be invalid. The following description provides an example of techniques that may be implemented by the network to address the timing and beam information issues that are associated with an invalid TA.

During PUCCH SCell activation, after receiving the measurement report and its beam information, the network may determine the associated SSB in the PDCCH order to trigger RACH on the target PUCCH SCell if the TA of the target PUCCH SCell is invalid. The associated SSB may be selected by the network based on the L1 measurement report. For example, the SSB associated with the most favorable metric may be selected. Since the SSB is QCLed with a CSI-RS, a metric corresponding to either SSB or CSI-RS may be used to select the associated SSB in the PDCCH order. However, this example is merely provided for illustrative purposes, this selection may be performed by the network on any appropriate basis.

In addition, the network may determine the active TCI for the PDCCH, PDSCH and/or CSI-RS of the target PUCCH SCell. The TCI may be selected by the network based on the L1 measurement report. For example, the active TCI may be QCLed with an SSB and/or CSI-RS. The SSB and/or CSI-RS associated with the most favorable metric may provide the basis for the network to determine the active TCI. However, this example is merely provided for illustrative purposes, this selection may be performed by the network on any appropriate basis.

Further, the network may determine an active uplink spatial relation for the PUCCH of the target PUCCH SCell. The uplink spatial relation may be determined by the network based on the L1 measurement report. For example, the SSB and/or CSI-RS associated with the most favorable metric may provide the basis for the network to determine the uplink spatial relation. However, this example is merely provided for illustrative purposes, this selection may be performed by the network on any appropriate basis.

In 630, the target PUCCH SCell is activated. Accordingly, in 635, the UE 110 may transmit UCI to the PUCCH SCell.

Figure 7:
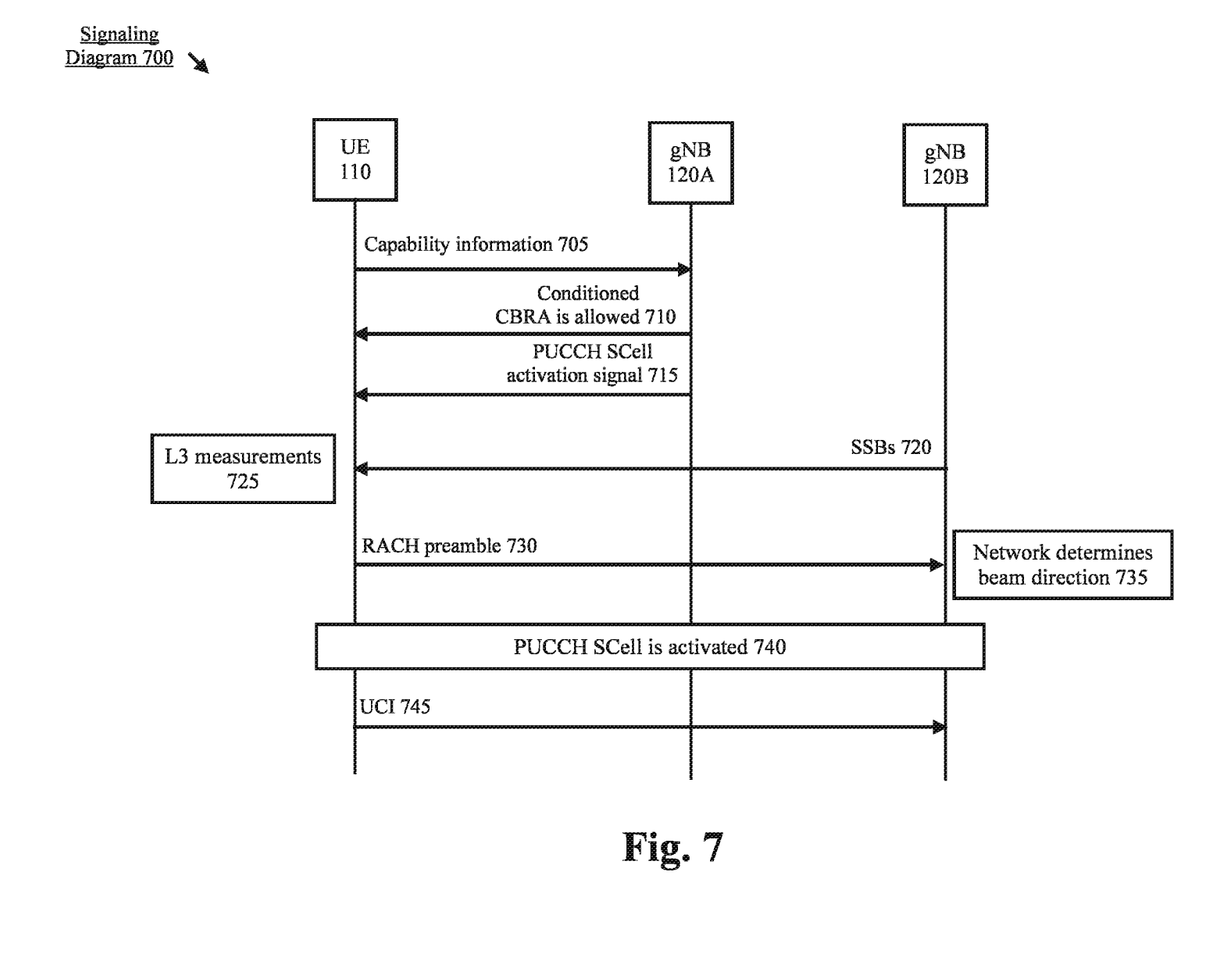
FIG. 7 shows a signaling diagram for using contention based random access (CBRA) during PUCCH SCell activation according to various exemplary embodiments.

FIG. 7 shows a signaling diagram 700 for using contention based random access (CBRA) during PUCCH SCell activation according to various exemplary embodiments. The signaling diagram 700 includes the UE 110, the gNB 120A and the gNB 120B. In this example, the gNB 120A may perform operations associated with a PCell and the gNB 120B may perform operations associated with a SCell.

Under conventional circumstances, CBRA may be utilized after a PUCCH SCell has been activated. The exemplary embodiments introduce CBRA during the PUCCH SCell activation procedure.

In 705, the UE 110 transmits capability information to the gNB 120A. The capability information may indicate to the network whether the UE 110 supports conditioned CBRA on the target PUCCH SCell during PUCCH SCell activation. Those skilled in the art will understand that conditioned CBRA refers to a time-limited CBRA procedure. In this example, this procedure may only be performed on the target PUCCH SCell during the PUCCH SCell activation procedure when the UE 110 and the network support this feature.

In 710, the gNB 120A may transmit a signal to the UE 110 indicating whether it will allow the UE 110 to perform conditioned CBRA on the target PUCCH SCell during PUCCH SCell activation.

In 715, the UE 110 receives a PUCCH SCell activation signal. The PUCCH SCell activation signal may indicate to the UE 110 that PUCCH SCell activation has been triggered by the network. For example, the PUCCH SCell activation signal may trigger conditioned CBRA on the target PUCCH SCell. However, reference to the PUCCH SCell activation signal is merely provided for illustrative purposes. The UE 110 may determine that PUCCH SCell activation has been initiated based on any appropriate type of signal received from the network or on any other appropriate basis.

In 720, the target PUCCH SCell may broadcast SSBs. In 725, the UE 110 performs L3 measurements on the SSBs.

In 730 the UE 110 transmits a RACH preamble associated with an SSB to the target PUCCH SCell. The SSB may be selected by the UE 110 based on the SSB measurements performed in 725.

In 735, the network determines a beam direction with which to serve the UE 110. For example, the network may monitor all possible beam directions associated with all the possible SSBs. The RACH preamble may indicate to the network an adequate beam direction with which to serve the UE 110. In addition, the network may determine the active TCI for PDCCH, PDCSH and/or CSI-RS of the target PUCCH SCell. The active TCI may be directly or indirectly QCLed with the SSB from the conditioned CBRA. Further, the network may determine the uplink spatial relation for the PUCCH of the target PUCCH SCell. The uplink spatial relation may be directly or indirectly QCLed with the SSB from the conditioned CBRA.

In 740, the target PUCCH SCell is activated. Accordingly, in 745, the UE 110 may transmit UCI to the PUCCH SCell.

Under conventional circumstances, the UE may be restricted from cross PUCCH group reporting. Thus, the UE may perform measurements on the target PUCCH SCell but be restricted from reporting the beam information on the PUCCH to the PCell. In addition, since PUCCH SCell activation has not been completed, there may be no other PUCCH available on which to report the beam information. The exemplary embodiments introduce an exception to the cross PUCCH group reporting to enable PUCCH SCell activation.

Figure 8:
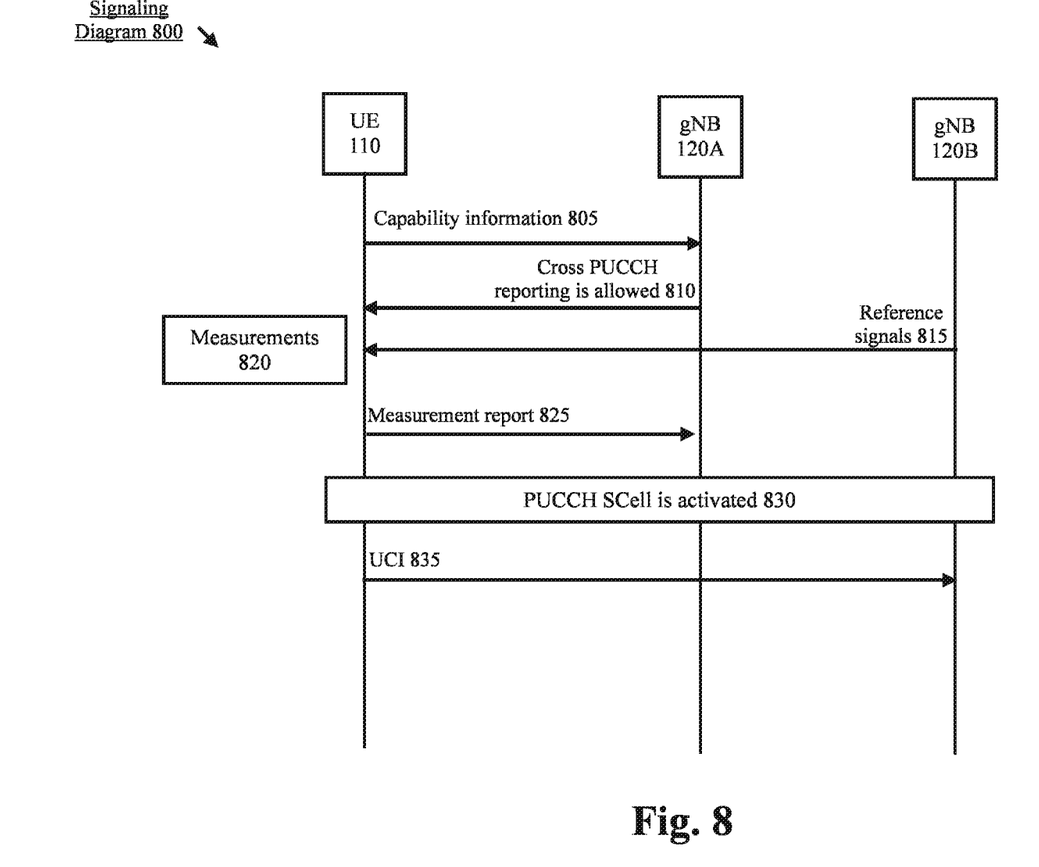
FIG. 8 shows a signaling diagram for cross PUCCH group reporting according to various exemplary embodiments.

FIG. 8 shows a signaling diagram 800 for cross PUCCH group reporting according to various exemplary embodiments. The signaling diagram 800 includes the UE 110, the gNB 120A and the gNB 120B. In this example, the gNB 120A may perform operations associated with a PCell and the gNB 120B may perform operations associated with a SCell.

In 805, the UE 110 transmits capability information to the gNB 120A. The capability information may indicate to the network whether the UE 110 supports cross PUCCH group CSI reporting for PUCCH SCell activation. In addition, the UE 110 may indicate which PUCCH group is to be used for this CSI reporting.

In 810, the gNB 120A may transmit a signal to the UE 110 indicating whether it will allow the UE 110 to perform cross PUCCH group reporting for PUCCH SCell activation. Those skilled in the art will understand that the PUCCH group for the target PUCCH SCell may is not yet configured. Thus, in this example, the cross PUCCH group reporting relates to an already established PUCCH group and a to be configured PUCCH group.

In 815, the target SCell (e.g., gNB 120B) may broadcast SSB, CSI-RS or any other appropriate type of reference signal. These resources may be aperiodic, semi-persistent or periodic. In 820, the UE 110 performs measurements on the signal transmitted in 815 to acquire the beam information associated with the target PUCCH SCell.

In 825, the UE 110 transmits a measurement report to the PCell (e.g., gNB 120A) over the PUCCH. In some embodiments, instead of the PCell, the UE 110 may transmit the measurement report to a different serving cell over the PUCCH. Subsequently, the network and/or the UE 110 may perform various operations to activate the target PUCCH SCell based on the measurement report transmitted to the PCell over the PUCCH.

In 830, the target PUCCH SCell is activated. Accordingly, in 835, the UE 110 may transmit UCI to the PUCCH SCell.

Figure 9:
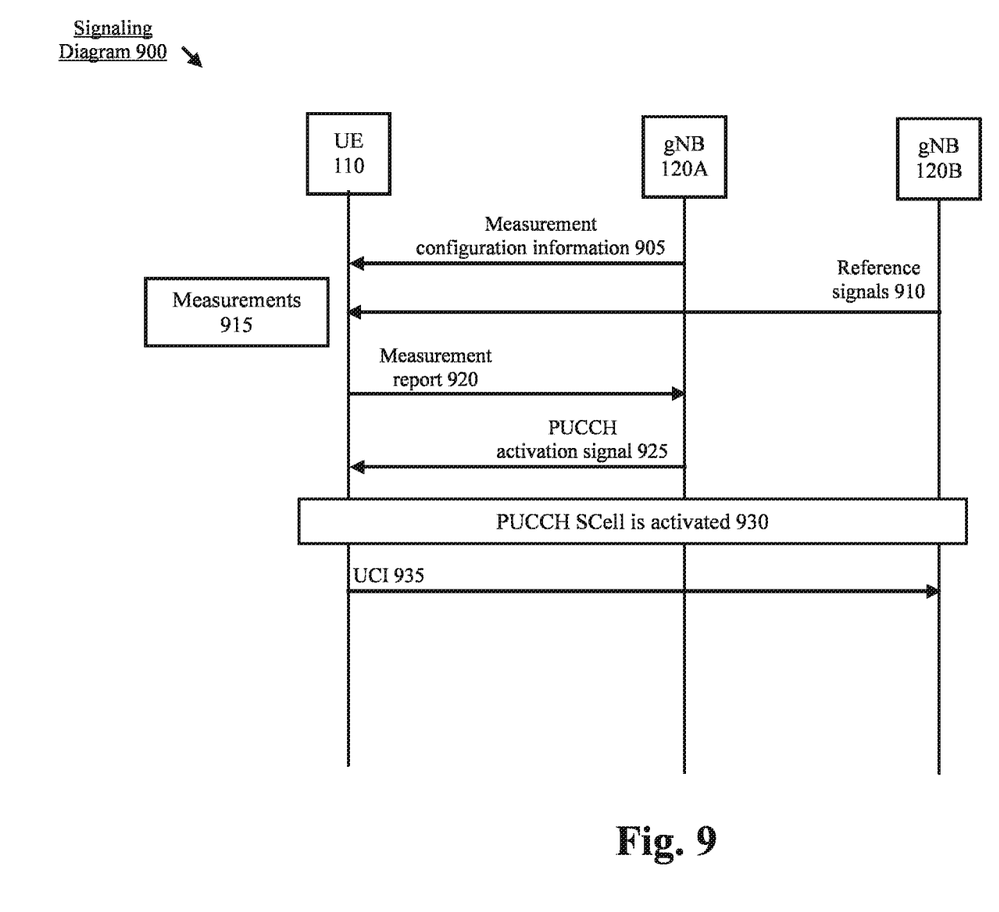
FIG. 9 shows a signaling diagram for preconditioned based PUCCH SCell activation according to various exemplary embodiments.

FIG. 9 shows a signaling diagram 900 for preconditioned based PUCCH SCell activation according to various exemplary embodiments. The signaling diagram 800 includes the UE 110, the gNB 120A and the gNB 120B. In this example, the gNB 120A may perform operations associated with a PCell and the gNB 120B may perform operations associated with a SCell.

In 905, the UE 110 receives configuration information for collecting and reporting measurement data corresponding to cells other than a serving cell. This configuration information may include an indication of the type of measurements to be performed, the type of reference signals to be measured, the type of metrics to be generated, threshold values or conditions that are to trigger the transmission of a measurement report, neighbor cell IDs or any other type of information that may enable the UE 110 to collect L3 measurement data corresponding to the target PUCCH SCell.

In 910, the target SCell (e.g., gNB 120B) may broadcast SSB, CSI-RS or any other appropriate type of reference signal. These resources may be aperiodic, semi-persistent or periodic. In 915, the UE 110 performs L1 and/or L3 measurements on the signal transmitted in 910 to acquire the beam information associated with the target PUCCH SCell.

In 920, the UE 110 transmits a measurement report to the PCell (e.g., gNB 120A). The measurement report may comprise the beam information corresponding to the target PUCCH SCell (e.g., gNB 120B). Like the measurement resources, the measurement report may be aperiodic, semi-persistent or periodic In 925, the UE 110 receives a PUCCH SCell activation signal corresponding to the target PUCCH SCell. The PUCCH SCell activation signal may indicate to the UE 110 that PUCCH SCell activation has been triggered by the network.

The exemplary embodiments introduce a network side restriction where the beam information of a target PUCCH Cell is to be obtained by the network before PUCCH SCell activation is initiated. Thus, in this example, if the measurement report does not include beam information corresponding to the gNB 120B, the network will not initiate PUCCH SCell activation for the gNB 120B.

Here, it is assumed that the measurement report in 920 includes beam information corresponding to the target PUCCH SCell. Accordingly, in 930, the target PUCCH SCell is activated. In 935, the UE 110 may transmit UCI to the PUCCH SCell.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
    receiving a signal from a network indicating that a physical uplink control channel (PUCCH) secondary cell (SCell) activation procedure has been initiated;
    generating, for transmission to the network, capability information indicating whether the UE supports cross PUCCH group channel state information (CSI) reporting;
    collecting beam information corresponding to a target PUCCH SCell, wherein the beam information includes beam measurement information;
    reporting the beam information to a primary cell (PCell) during the PUCCH SCell activation procedure;
    determining that the target PUCCH SCell has been activated as a PUCCH SCell; and
    generating, for transmission to the network, uplink control information (UCI) for the PUCCH SCell, wherein the UE is also configured with a different PUCCH corresponding to the PCell.

2. The processor of claim 1, wherein the target PUCCH SCell and the PCell are associated with different timing advances (TAs).

3. The processor of claim 1, wherein collecting the beam information includes performing layer 3 (L3) measurements on one or more signals transmitted by the target PUCCH SCell, and
    wherein reporting the beam information is performed using in a L3 measurement report.

4. The processor of claim 1, wherein collecting the beam information includes performing layer 1 (L1) measurements on one or more signals transmitted by the target PUCCH SCell, and
    wherein reporting the beam information is performed in a L1 measurement report.

5. The processor of claim 1, wherein the beam information is reported to the PCell on a physical uplink shared channel (PUSCH).

6. The processor of claim 1, wherein the beam information is reported to the PCell on the PUCCH corresponding to the PCell.

7. The processor of claim 1, wherein the collecting is performed during the PUCCH SCell activation procedure.

8. The processor of claim 1, wherein the collecting is performed prior to the reception of the signal indicating that the PUCCH SCell activation procedure has been initiated.

9. A processor of a user equipment (UE) configured to perform operations comprising:
    receiving a signal from a network indicating that a physical uplink control channel (PUCCH) secondary cell (SCell) activation procedure has been initiated;
    receiving an indication from the network indicating that conditioned contention based random access (CBRA) is permitted for the PUCCH SCell activation procedure;
    receiving one or more synchronization signal blocks (SSBs) from a cell;
    generating, for transmission to the network, a random access channel (RACH) preamble to the cell, wherein the RACH preamble is selected based on the one or more SSBs;
    determining that the cell has been configured as a PUCCH SCell for the UE; and
    generating, for transmission to the network, uplink control information (UCI) over a PUCCH to the cell, wherein the UE is also configured with a different PUCCH corresponding to a primary cell (PCell).

10. The processor of claim 9, the operations further comprising:
    transmitting capability information indicating whether the UE supports conditioned contention based random access (CBRA) for the PUCCH SCell activation procedure.

11. A processor of a base station configured to perform operations comprising:
    generating, for transmission to a user equipment (UE), a signal indicating that a physical uplink control channel (PUCCH) secondary cell (SCell) activation procedure has been initiated;
    receiving capability information indicating whether the UE supports cross PUCCH group channel state information (CSI) reporting from the UE; and
    receiving beam information corresponding to a target PUCCH SCell from the UE, during the PUCCH SCell activation procedure, wherein the beam information includes beam measurement information.

12. The processor of claim 11, wherein the base station and the target PUCCH SCell are associated with different timing advances (TAs).

13. The processor of claim 11, wherein reporting the beam information is performed using a layer 3 (L3) measurement report.

14. The processor of claim 13, the operations further comprising:
    determining an associated synchronization signal block (SSB) in a physical downlink control channel (PDCCH) order based on the L3 measurement report that is to be used to trigger a random access channel (RACH) procedure on the target PUCCH SCell.

15. The processor of claim 13, the operations further comprising:
    determining an active transmission configuration indication (TCI) that for the target PUCCH SCell based on the L3 measurement report.

16. The processor of claim 13, the operations further comprising:
    determining uplink spatial relation information for a PUCCH corresponding to the target PUCCH SCell based on the L3 measurement report.

17. The processor of claim 11, wherein reporting the beam information is performed using in a layer 1 (L1) measurement report.

18. The processor of claim 17, the operations further comprising:

determining an associated synchronization signal block (SSB) in a physical downlink control channel (PDCCH) order based on the L1 measurement report that is to be used to trigger a random access channel (RACH) procedure on the target PUCCH SCell.

* * * * *